Aug. 19, 1958 — H. ALFANDRE — 2,848,147
BUCKLE THREADING APPARATUS
Filed April 11, 1956 — 11 Sheets-Sheet 1

INVENTOR.
Harry Alfandre
ATTORNEYS

Aug. 19, 1958 H. ALFANDRE 2,848,147
BUCKLE THREADING APPARATUS
Filed April 11, 1956 11 Sheets-Sheet 2

INVENTOR.
Harry Alfandre
BY
ATTORNEYS

Aug. 19, 1958      H. ALFANDRE      2,848,147
BUCKLE THREADING APPARATUS

Filed April 11, 1956      11 Sheets-Sheet 3

INVENTOR.
Harry Alfandre
BY Edwin Levisohn +
Harry Cole
ATTORNEYS

Aug. 19, 1958 H. ALFANDRE 2,848,147
BUCKLE THREADING APPARATUS
Filed April 11, 1956 11 Sheets-Sheet 5

INVENTOR.
Harry Alfandre
BY Edwin Lieroll +
Harry Cole
ATTORNEYS

Aug. 19, 1958 H. ALFANDRE 2,848,147
BUCKLE THREADING APPARATUS
Filed April 11, 1956 11 Sheets-Sheet 6
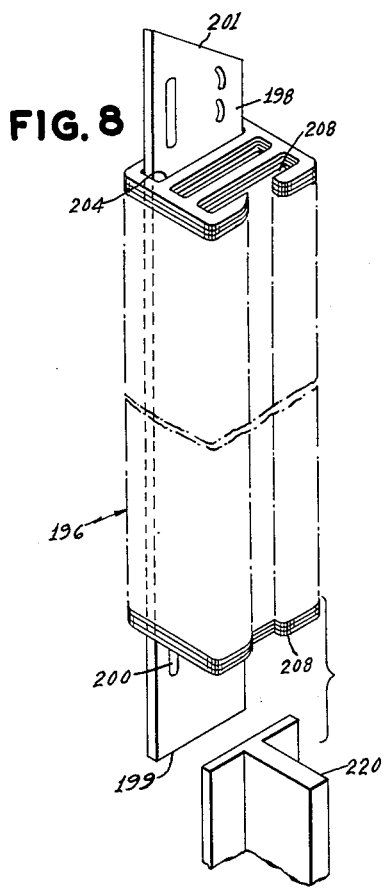
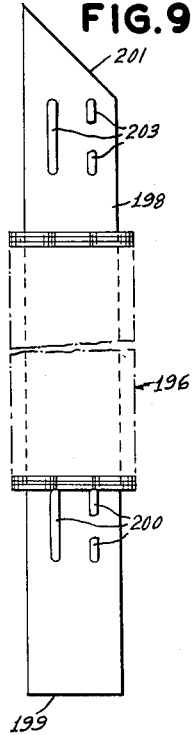
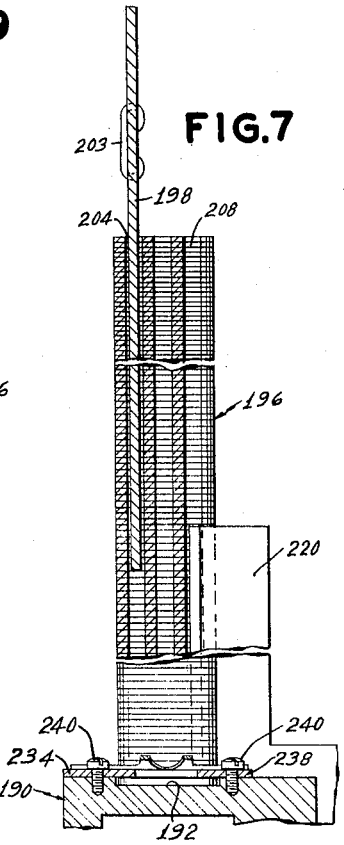
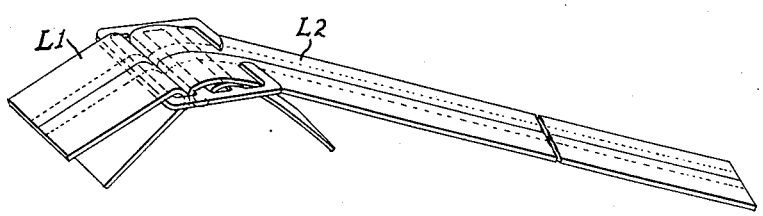
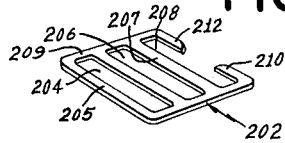
INVENTOR.
Harry Alfandre
BY
ATTORNEYS

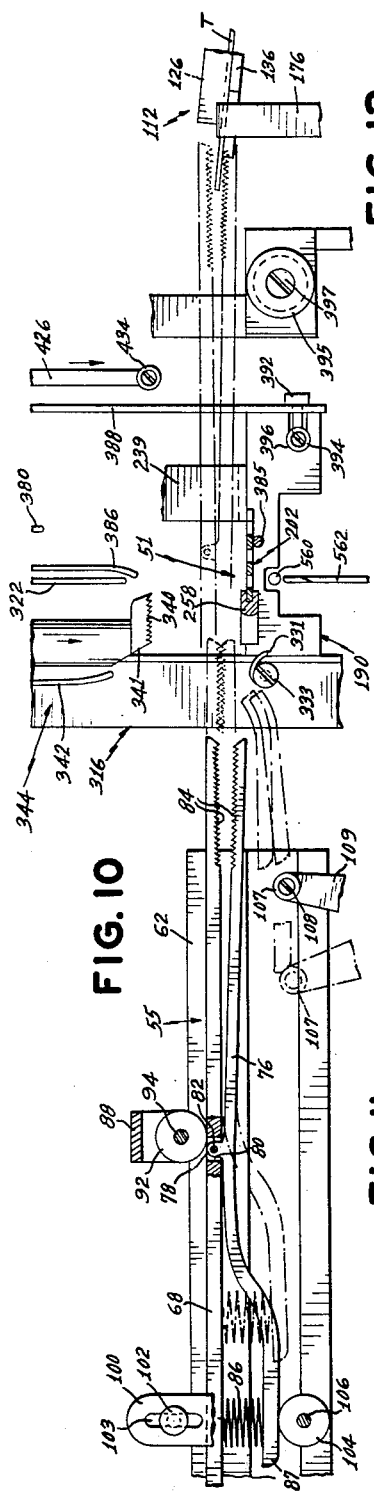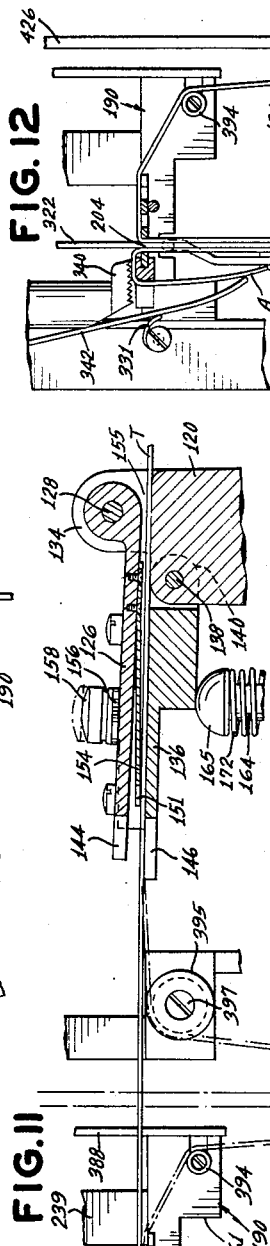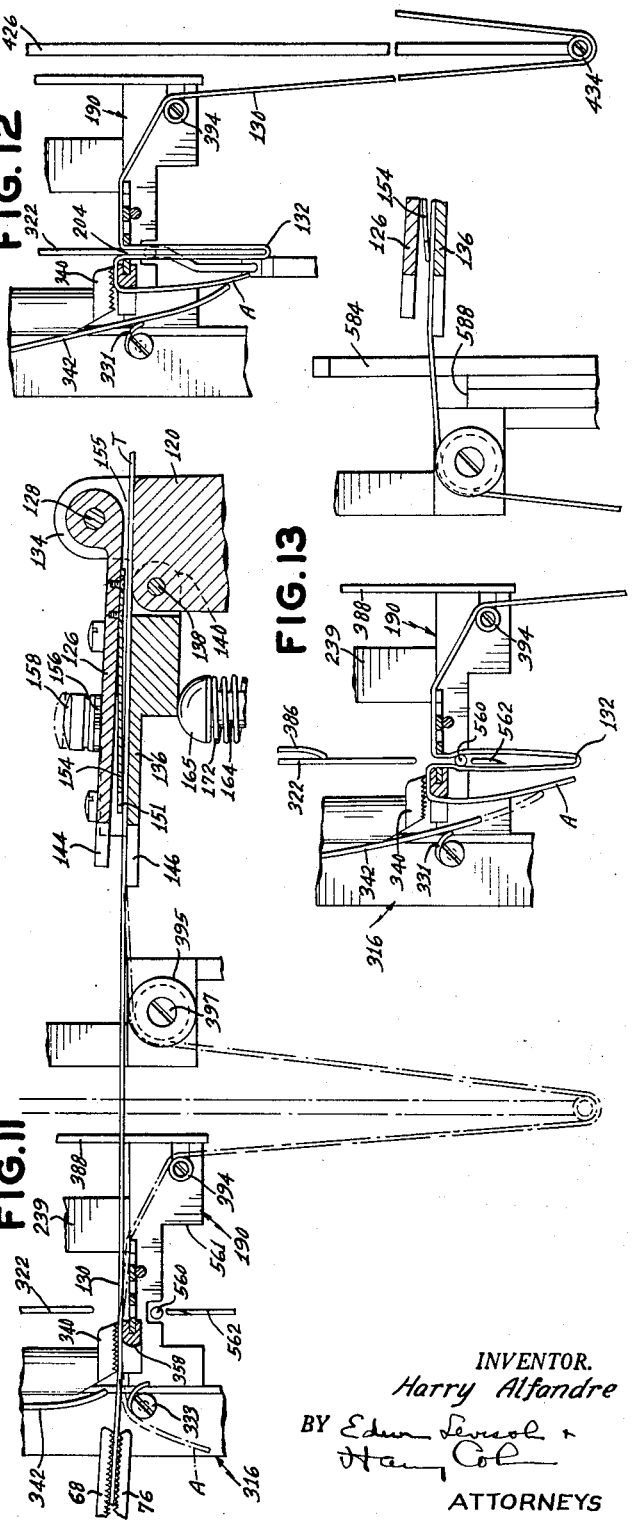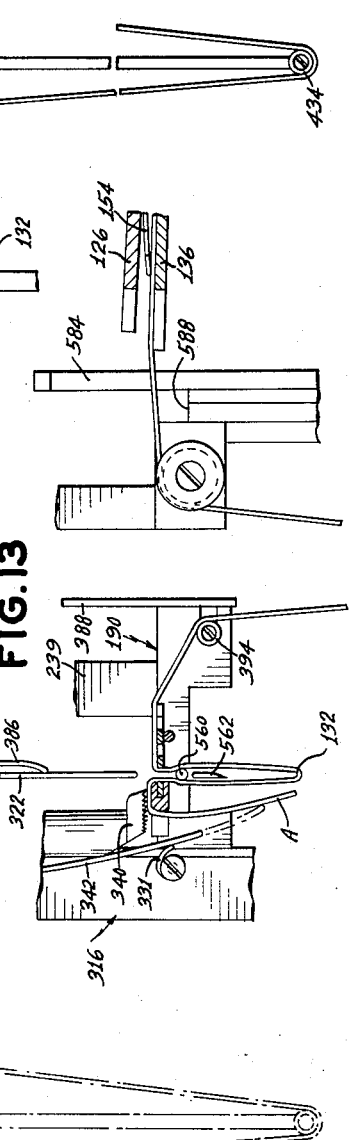

Aug. 19, 1958          H. ALFANDRE          2,848,147
BUCKLE THREADING APPARATUS
Filed April 11, 1956          11 Sheets-Sheet 8
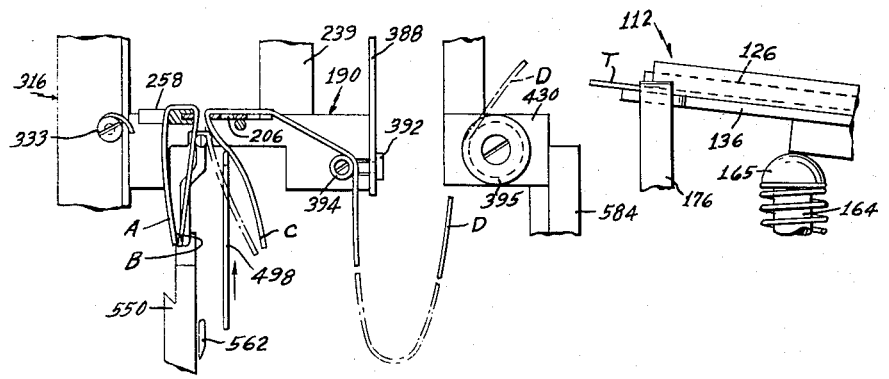
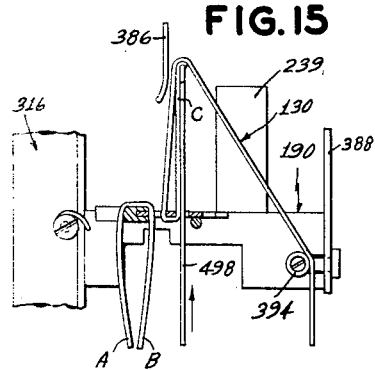
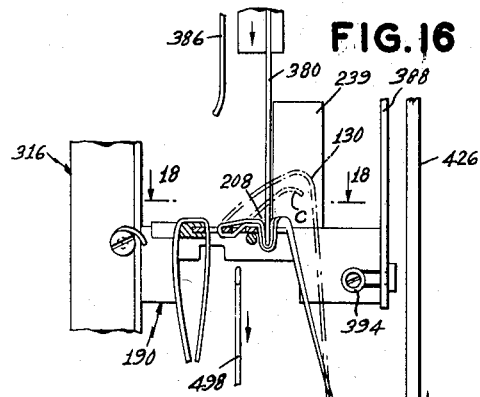
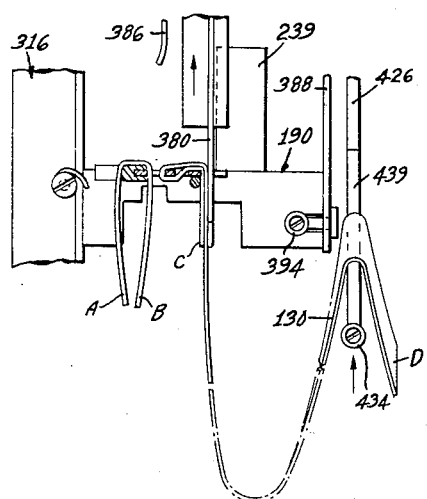
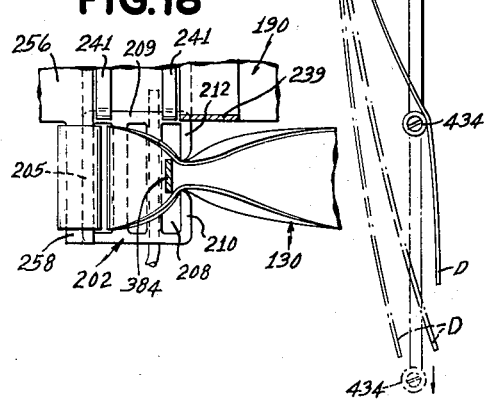
INVENTOR.
Harry Alfandre
BY
ATTORNEYS Aug. 19, 1958  H. ALFANDRE  2,848,147
BUCKLE THREADING APPARATUS
Filed April 11, 1956  11 Sheets-Sheet 9

INVENTOR.
Harry Alfandre
BY
ATTORNEYS

Aug. 19, 1958        H. ALFANDRE        2,848,147
BUCKLE THREADING APPARATUS
Filed April 11, 1956        11 Sheets-Sheet 10
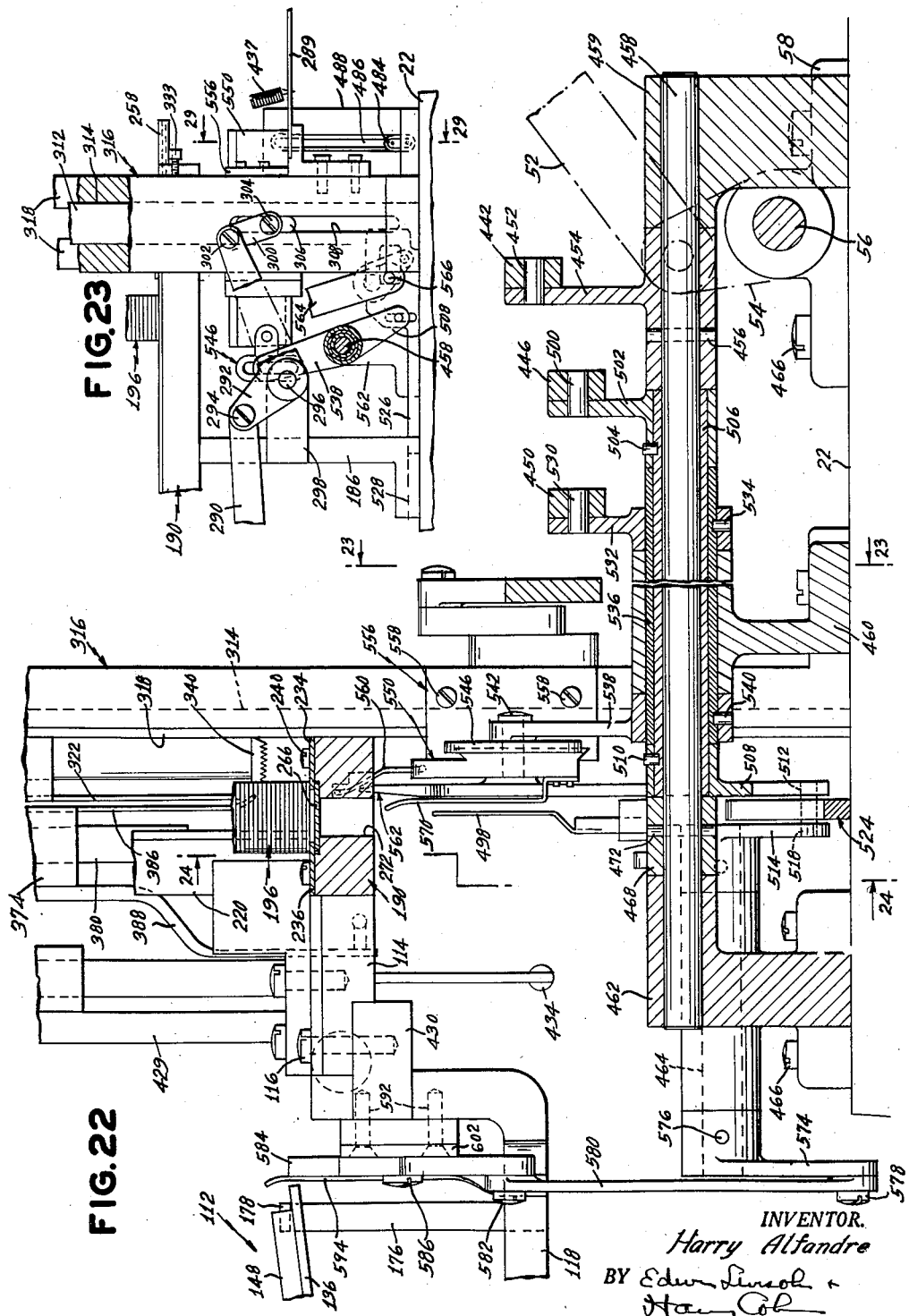
INVENTOR.
*Harry Alfandre*
BY
ATTORNEYS

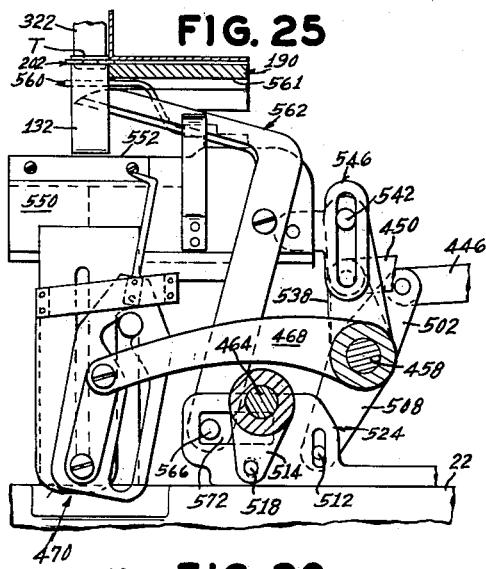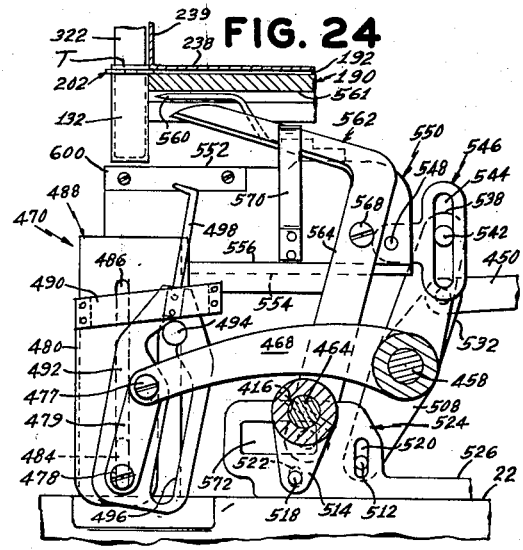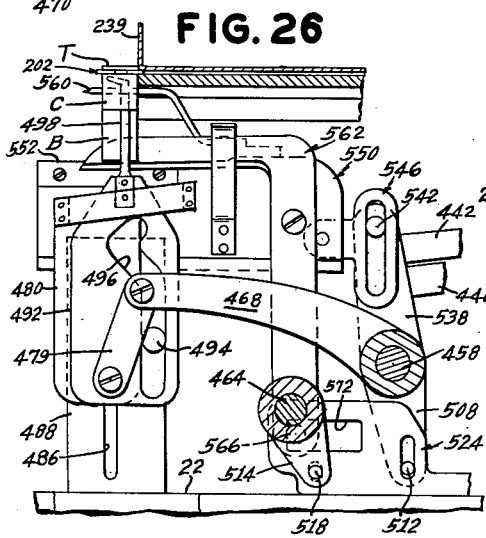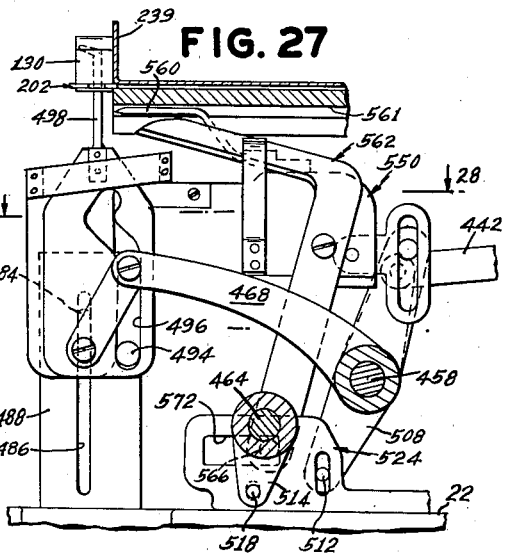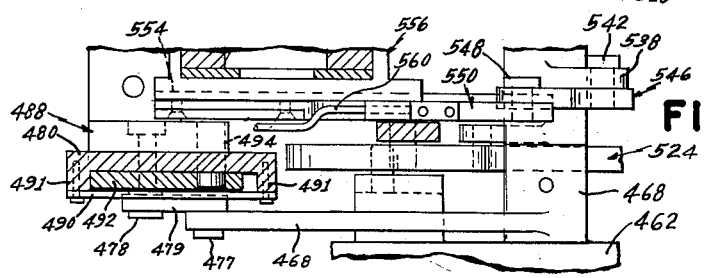

United States Patent Office 2,848,147
Patented Aug. 19, 1958

2,848,147

BUCKLE THREADING APPARATUS

Harry Alfandre, Jamaica, N. Y., assignor to Scovill Manufacturing Company, Waterbury, Conn.

Application April 11, 1956, Serial No. 577,582

24 Claims. (Cl. 223—49)

The present invention relates to a device for facilitating the insertion of straps or tapes through the openings in buckles or similar members. Although the device is adapted for other purposes, it is intended primarily for use in the manufacture of adjustable shoulder straps of the type extensively utilized in ladies' undergarments.

The subject matter of the present application is related to the subject matter of my copending application, Serial No. 246,834, filed September 15, 1951, now Patent No. 2,742,205, issued April 17, 1956. In said patent, there is described and claimed an apparatus for the automatic assembly of straps and buckles, wherein the buckles are automatically supplied and fed to a threading station at which they are retained while the tape or strap is threaded therethrough, the threaded buckle being ejected from the threading station as the succeeding buckle arrives thereat.

It is an object of the present invention to provide a buckle threading apparatus, of the described type, which is of generally improved and simplified construction.

Another object is the provision of a buckle threading apparatus of greater compactness and efficiency.

Another objective is generally to improve the art of manufacturing adjustable straps and to provide a highly effective apparatus for that purpose.

Another object is to provide a highly novel discharge device for guiding the assembled strap and buckle from the threading station, which device serves to retain the buckle in position during the threading thereof.

A further object is to provide novel means for controlling the tape during the threading thereof through the buckle.

The above and other objectives, features and advantages of the present invention will be more fully understood from the following description considered in connection with the accompanying illustrative drawings.

In the drawings, which illustrate the best mode presently contemplated of carrying out the invention:

Fig. 7 is a fragmentary sectional view, taken on the line 7—7 of Fig. 6;

Fig. 8 is a perspective view of a buckle magazine in position preparatory to the discharge of buckles thereof onto the buckle-stacking bar of the buckle threading apparatus;

Fig. 9 is a side view of the buckle magazine;

Fig. 10 is a fragmentary sectional view, on an enlarged scale, taken on the line 10—10 of Fig. 4, with parts broken away for purposes of illustration;

Figs. 11–17 are fragmentary views, similar to Fig. 10, partially in section, illustrating various steps in the buckle threading operation;

Fig. 18 is a fragmentary, sectional view, taken on the line 18—18 of Fig. 16;

Fig. 22 is a fragmentary sectional view, on an enlarged scale, taken on the line 22—22 of Fig. 4;

Fig. 23 is a fragmentary sectional view, taken on the line 23—23 of Fig. 22;

Fig. 24 is a fragmentary sectional view, taken on the the line 24—24 of Fig. 22;

Figs. 25, 26 and 27 are views similar to Fig. 24 showing different operating positions of the mechanism;

Fig. 28 is a fragmentary sectional view, taken on the line 28—28 of Fig. 27;

Fig. 30 is a perspective view of a buckle utilized in the present apparatus; and Fig. 31 is a perspective view of a threaded buckle assembly delivered by the apparatus of the present invention.

Briefly described, the strap and buckle assembly apparatus 10 of the present invention automatically provides a threaded buckle assembly of the type illustrated in Fig. 31, which utilizes buckles of the type illustrated in Fig. 30. The leading end of a flexible tape or strap T (Fig. 1), preferably formed of a suitable fabric, is initially inserted into the apparatus 10, and during the course of operation of said apparatus, a predetermined length of said tape is periodically withdrawn from the supply thereof. The withdrawn tape length is threaded through the buckle to provide a first loop L1 (Fig. 31) and an adjustable loop L2. As is well known to those skilled in the art, the loop L1 is secured to a lady's undergarment, or the like, and one end of the loop L2 is also secured to the garment; the other end thereof being free to permit the adjustment of the loop L2 for varying the strap length.

Figure 1:
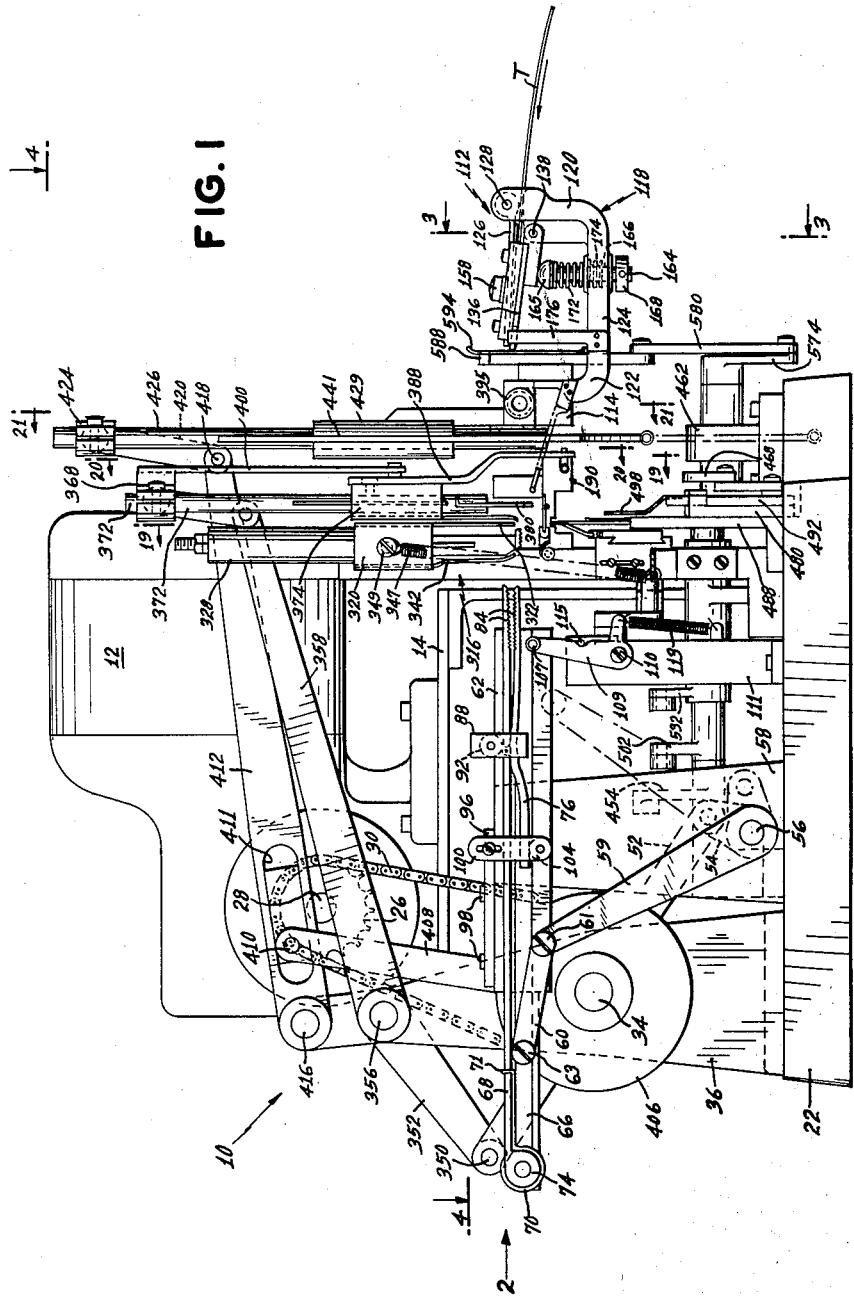
Fig. 1 is a front elevation of a buckle threading apparatus pursuant to the present invention.
Figure 2:
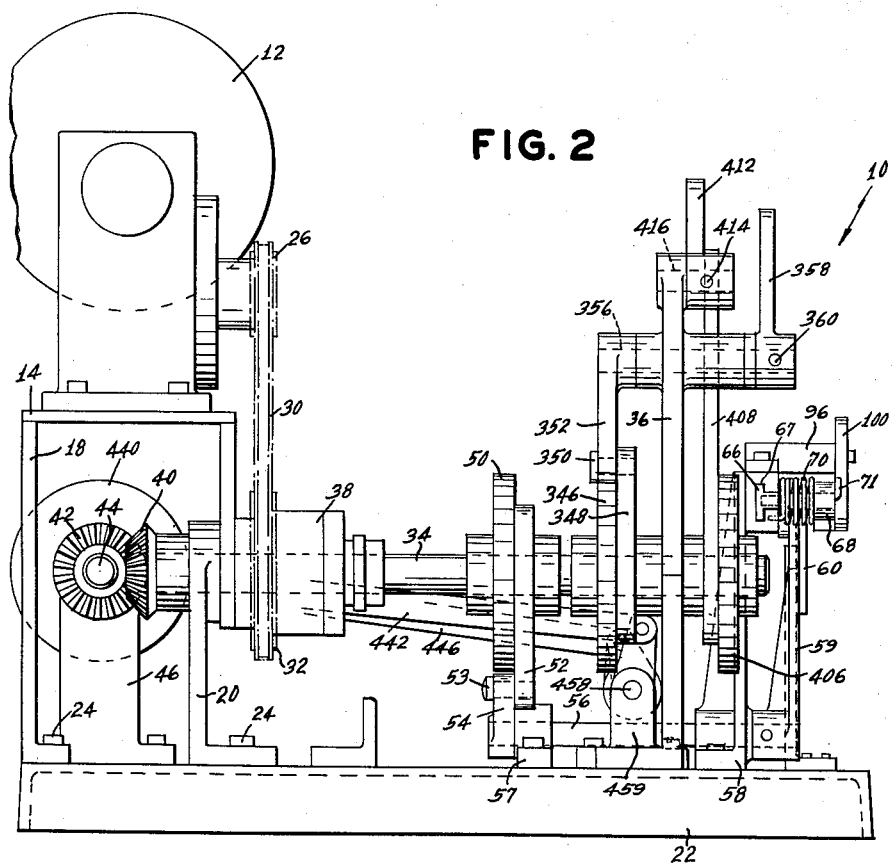
Fig. 2 is an end view taken in the direction of the arrow 2 in Fig. 1.
Figure 4:
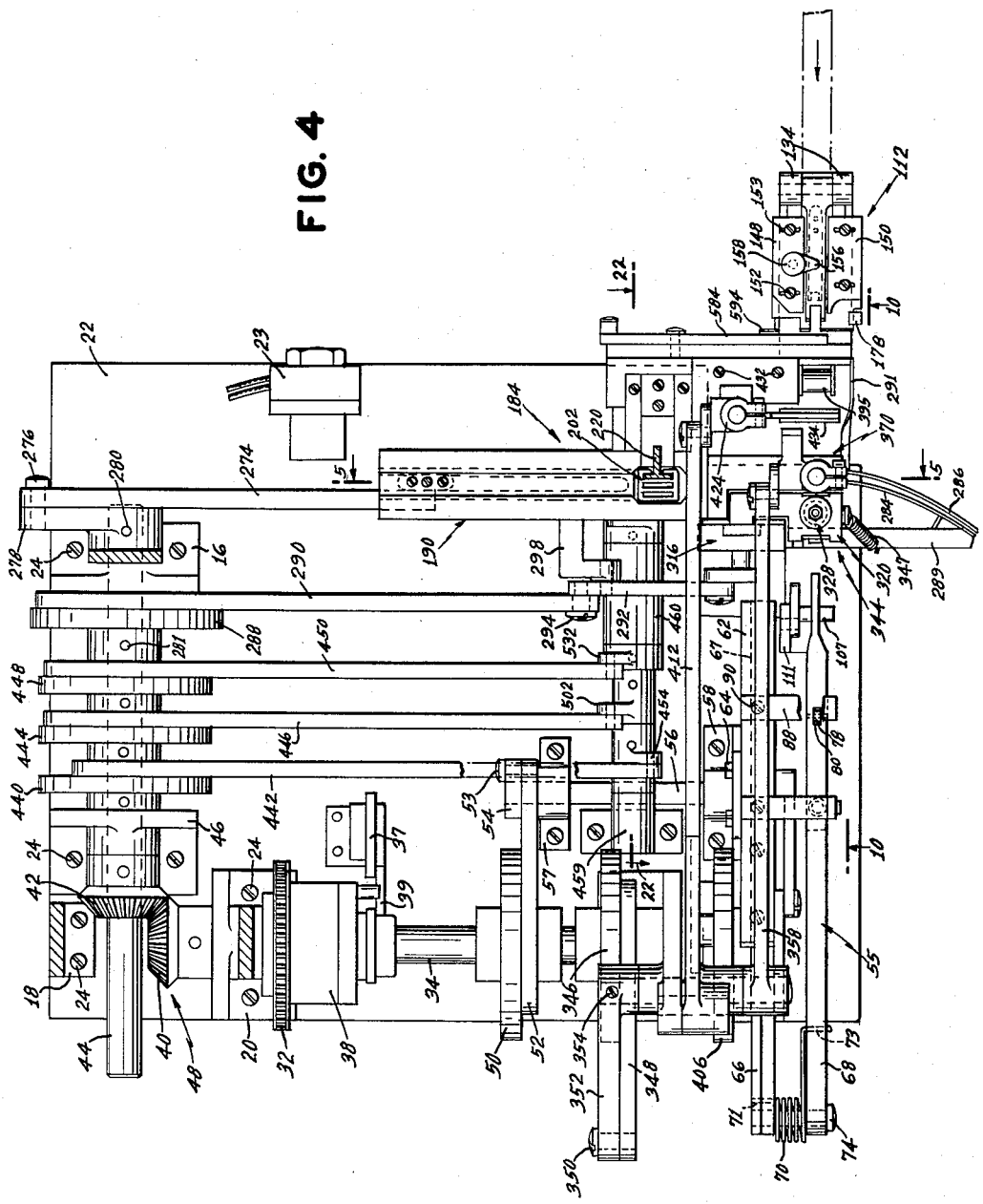
Fig. 4 is a top plan view, partially in section, taken on the line 4—4 of Fig. 1.

Referring now to Figs. 1, 2 and 4 in detail, the power for operating the apparatus 10 is supplied by a motor 12 which is suitably mounted on a plate 14. The plate is carried by the brackets 16, 18 and 20 which are mounted on a base member or bed plate 22, as by the bolts 24. Said bed plate facilitates the mounting of the apparatus on a suitable work table or bench. An On-Off switch 23 for controlling the energization of the motor 12 is suitably mounted on the base support 22. The shaft 28 of the motor 12 mounts a sprocket gear 26 which drives a sprocket chain 30 connected to a gear 32 mounted by the main drive shaft 34. The shaft 34 is journalled, at one end thereof, in a bracket 36 and is provided with a standard single revolution clutch 38, the stop for which is indicated at 37, the release for said stop being indicated at 39. The clutch serves to couple the bevel gear 40 to the drive shaft 34. The gear 40 is in mesh with a companion bevel gear 42 which is mounted by the shaft 44, the latter being journalled in the previously mentioned bracket 16 and in a bearing 46 which is mounted on the base plate 22. The motor 12, operating through the main drive shaft 34 and the secondary drive shaft 44, constitutes the drive mechanism of the present apparatus which is generally indicated by the reference numeral 48.

The shaft 34 mounts a cam 50 which controls the operation of mechanism, generally indicated by the reference numeral 55, for gripping the free end of the tape T to withdraw and position the latter at a threading or assembly station, generally indicated by the reference numeral 51, at which the tape is threaded through a buckle. The cam 50 is of the internal or grooved type and drives a link follower member 52 which is connected to a crank arm 54, as by the bolt 53. The crank arm 54 is mounted on a shaft 56. The shaft 56 is journalled in bearings 57 and 58 which are mounted on the base plate 22. The shaft 56 also mounts a crank arm 59 and it will be understood that the cam 50 is effective, through the described linkage and crank arm 54 to oscillate the shaft 56 for rocking the crank 59 between the full and broken line positions thereof illustrated in Fig. 1.

The previously mentioned bracket 58 mounts a channel shaped guide member 62, which is secured thereto as by the bolts 64. A slide member 66 is mounted for horizontal reciprocation in the guideway 67 defined in the guide member 62. A link 60 is pivotally interconnected, as at 61 and 63, between the crank arm 59 and the slide 66 to effect the horizontal reciprocation of the latter. An upper jaw or tape withdrawal member 68 is pivoted, as by the pivot element 74, to one end of the slide member 66. A complementary lower jaw or tape withdrawal member 76 is provided with a nib 78 (Fig. 10) which projects into a slot 80 defined in the upper jaw member 68, and is pivoted to the latter, as at 82. It will be noted that both jaw members are serrated, as at 84—84, at the front of gripping ends, respectively, thereof and that the opposite end of the lower jaw member is bent downwardly from the nib 78 thereof. A compression spring 86 is interposed in position between the rear end 87 of the lower jaw member and the opposing portion of the upper jaw member 68, for biasing the serrated ends of the jaw members together.

An angled bracket 88 is secured, as at 90, to the channel member 62. Said bracket mounts a roller 92, by means of a pin 94, the roller being positioned to overlie the upper jaw member 68. To the left of the bracket 88, viewing Figs. 1, 4 and 10, provision is made for an L-shaped bracket 96 which is adjustably secured, as by the bolts 98 to the channel member 62. The bracket 96 mounts an adjustable plate 100, which depends therefrom, being secured thereto, as by the bolt 102 which extends through the elongated slot 103 provided in the member 100. The plate 100 mounts a roller 104, on the pin 106 carried thereby. It will be noted that the roller 104 is positioned to engage the undersurface of the lower jaw 76, at the downwardly bent rear end 87 thereof. The roller 104, when it engages the lower jaw member 76, as illustrated in full line in Fig. 10, serves to retain the serrated ends of both jaw members in open spaced relation, against the bias of the spring 86, said ends being moved together by the spring 86 when the lower jaw member rides off the roller 104, as illustrated in broken line in said figure. A torsion spring 70 is mounted on the previously mentioned pivot 74, between the slide 66 and the upper jaw member 68. One end of said torsion spring is secured in the slide 66, as at 71, and the other end thereof underlies the upper jaw member 68 as at 73. The spring 70 provides an upward bias on the upper jaw member 68 so as to urge the latter against the roller 92.

Figure 3:
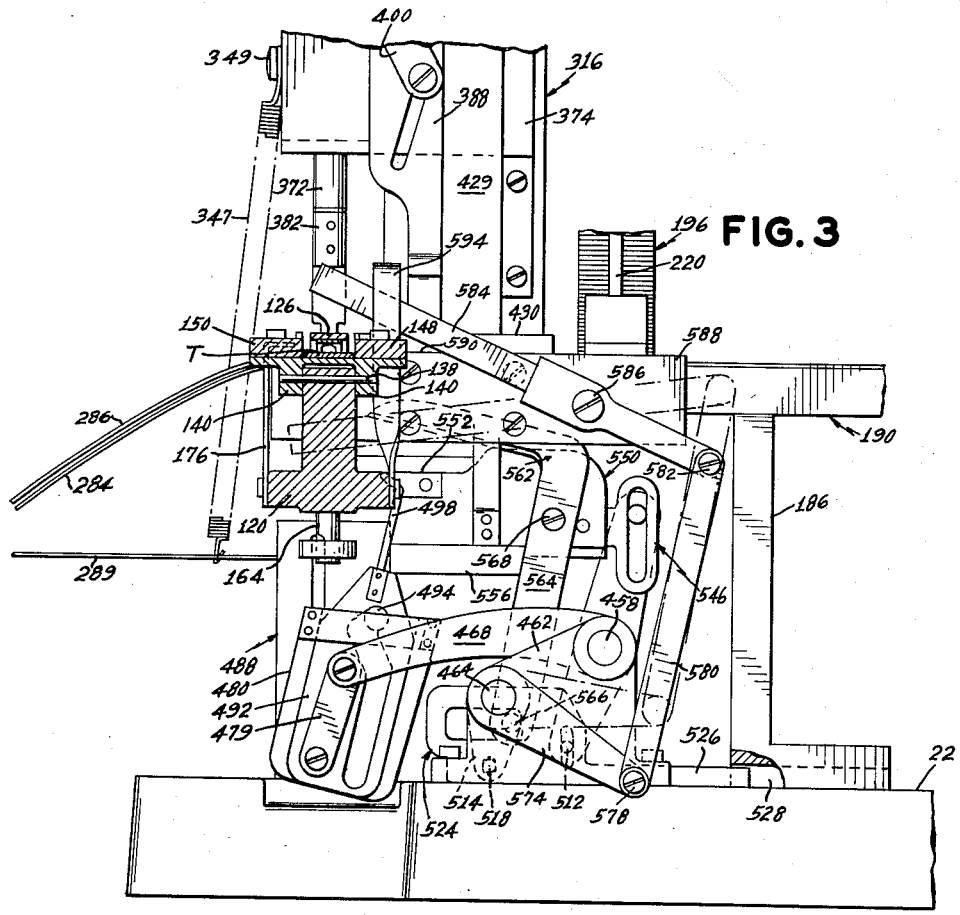
Fig. 3 is an end view partially in section and on an enlarged scale, taken on line 3—3 in Fig. 1.

Provision is made for a tape feed device, generally indicated by the reference numeral 112 from which the tape is withdrawn by the tape pulling mechanism 55. The feed device 112 comprises a generally U-shaped member 118 which is secured to a bracket 114, as by the securing element 116 (Fig. 22). The member 118 is provided with the opposed arms 120 and 122 interconnected by a base portion or bight 124. A laterally extending member or finger 126 (Fig. 11) is pivotally mounted by the pivot element 128 carried by a pair of upstanding tabs or ears 134—134 on the arm 120. The arm 120 also mounts a second pivot pin 138 for a second pivoted member or finger 136 which is mounted below the pivoted member 126, and which is much wider than the latter. The member 136 is provided with the spaced depending portions 140—140 (Fig. 3) which straddle the arm 120 and in which the pin 138 is engaged. The free end of the upper finger 126 is forked, as at 144, and the underlying free end of the member 136 is forked, as at 146. Extending longitudinally thereof, on the upper surface thereof, the member 136 mounts the spaced guide plates 148 and 150, which are adjustably mounted thereon, as by bolts 152 extending through cooperating slots 153 defined in said guide plates. As best shown in Fig. 3, there is sufficient clearance between the guide plates 148 and 150 for the upper finger 126 to move therebetween toward and away from the lower member 136. A leaf spring 154 is secured to the undersurface of the finger 126 and is provided with a free forked end 151. It will be noted that a passageway 155 for the tape T is defined between the pivoted fingers 126 and 136, the sides of said passageway being bounded by the guide members 148 and 150. A finger piece 158 is threadedly secured in the guide member 148 and is provided with a laterally extending detent 156 which overlies the finger 126, as best illustrated in Fig. 4, said finger piece 158 being adjustable between the full and broken line positions thereof, as illustrated in Fig. 11, for controlling the stressing of the spring 154. A pin 164 having the enlarged head 165 is mounted within an aperture 166 provided in the base 124 of the member 118. The pin extends through a coiled spring 172, one end of which is seated within a recess 174 defined within the base 124 about the aperture 166 therein, the other end bearing against the head 165. The pin is also provided with a detent collar 168, below the base 124. It will be apparent that the spring 172 tends to urge the enlarged head 165 of the pin 164 against the overlying portion of the pivoted finger 136 so that both the latter and the other finger 126 float on their respective pivots. The upward movement of the floating finger 136 is limited by a detent element 176 extending upwardly from the base 124 of the member 118 and provided with a bent portion 178 which overlies the forked end of the member 136.

A mechanism, generally indicated by the reference numeral 184, operates to automatically transfer buckles in timed relation from a supply stack thereof to the previously mentioned threading station 51. More specifically, provision is made for the base support members 186 and 316, suitably carried by the base plate 22 which mounts the guide member 190 (Figs. 5 and 6) in which there is defined a buckle slide way 192. The elongated plate 234 is secured at one side of the upper surface of guide member 190 and, at the other side thereof, the guide member has similarly secured thereto the spaced plates 236 and 238, all of said plates being secured, as by the elements 240, and overlying the slideway 192. A vertically extending T bar or buckle mounting device 220 is suitably mounted so as to extend upwardly from the guide member 190, said member extending between the spaced plates 236 and 238. Plate 238 has a portion or arm 239 which extends vertically upwardly therefrom, the function of which is hereinafter described. In order to accommodate the buckles 202 for the passage thereof from the bar 220 into the slideway 192, the plates 234, 236 and 238 are provided with the cut outs 248, as best illustrated in Fig. 6. In this connection, it will be noted from Fig. 30 that the buckles 202 are of the type having an enclosed outer and inner eyelet 204 and 206, respectively, and a third or outer eyelet 208 which is open between confronting ribs 210 and 212 thereof. The buckles 202 are mounted, in a stack, on the bar 220 by engaging the open outlets 208 over the T-shaped head of the bar 220, as best illustrated in Fig. 6.

In order to expeditiously thread the buckles onto the T-bar 220, the buckles are provided on a stacking and transferring device, designated generally by the reference numeral 196 in Figs. 7, 8 and 9. Said device comprises a strip 198 of suitable material, such as steel, wood, cardboard, fiberboard, etc., although fiberboard is preferred. One end of said strip is first provided with suitable buckle retaining means which penetrate the strip and extend from the face thereof, such as the wire staples 200, to prevent the buckles from moving off that end of the strip. The other end of the strip is tapered as at 201, to facilitate the insertion of said end of the strip preferably into the buckle eyelets 204. After the desired number of buckles are stacked on a strip, it is again stapled, as at 203, at said tapered end, whereby it will be apparent that the buckles are now retained on the strip by the staples at both ends thereof. In order to thread the buckles onto the T-bar 220, the strip is held above the T-bar, with the tapered end uppermost, and a few of the buckles are threaded onto T-bar 220, more specifically, the open ended eyelets 208 being so threaded on the T-bar in the manner illustrated in Fig. 7. Thereafter, the lower end portion 199 of the strip is severed therefrom immediately above the staples 200 so that the entire stack of buckles slips off the strip and threads onto the T-bar 220, Fig. 7 illustrating the buckles moving off the strip onto the T-bar.

The overlying guide plate 234 is cut out, as at 254 (Figs. 5 and 6), and the guide member 190 is cut out at the front thereof, as at 255, to receive an elongated guide part 256 which is suitably secured to the member 190, as at 257—257. The guide part 256 is provided with an elongated projection 258 which extends outwardly beyond the guide member 190, and which also extends beyond the upwardly projecting arm 239 of the previously mentioned guide plate 238. A groove 260 is defined in said guide member 256, extending through the projection 258, thereof and being in alignment with the previously mentioned slideway 192 defined in the guide member 190. A twin fingered leaf spring 242 is secured to the plates 234 and 238, with the projecting fingers thereof overlying the slideway 192 and extending between the plate 238 and the guide member 256. A downwardly extending guide rod 284 is provided, at the upper end thereof, with a horizontal portion 285 which is spaced laterally of the guide member 258, and which portion extends into and is secured by the guide member 190, and which also serves as a continuation of the slideway 192. The guide member 284 curves downwardly from the upper portion 285 thereof, and extends to a suitable receiving bin or similar receptacle (not illustrated). A strut 287 extending from a rigid member 289, suitably secured to the apparatus, serves to support the guide rod 284 in position. Provision is also made for a cooperating guide rod 286 disposed laterally and upwardly of the guide rod 284 by means of a suitable rigid member 291 carried by the apparatus, the function of said guide rods 284 and 286 being hereinafter described in detail.

A slide 266 is mounted for horizontal reciprocation in the slideway 192. More specifically, the slide 266 is secured, as by the elements 268, to a cross head 270 which extends into an elongated slot 272 provided in the guide member 190. The cross head is pivotally secured, as at 271, to one end of a link 274, the other end of which is pivoted, as at 276, to a crank arm 278 (Fig. 4). The crank arm 278 is secured to the previously mentioned shaft 44, as at 280, whereby the rotation of the shaft is effective to provide for the horizontal reciprocation of the link 274.

Figure 5:
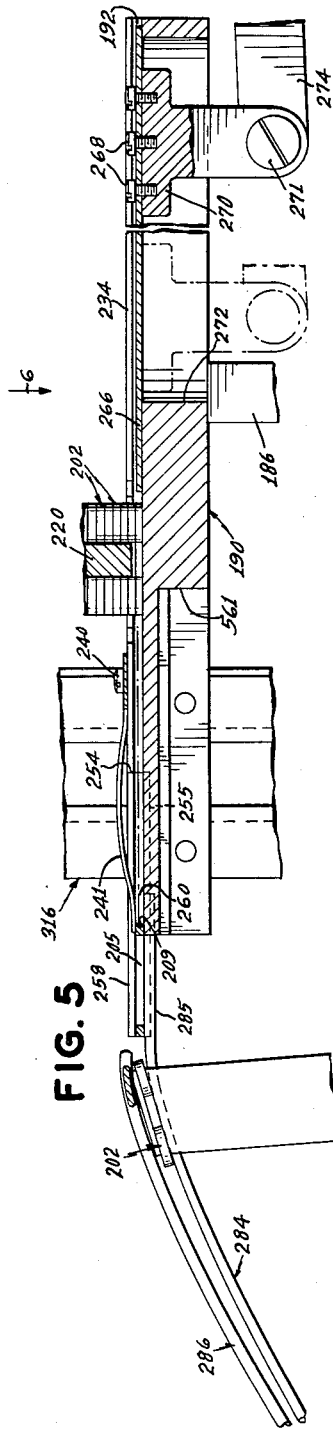
Fig. 5 is a sectional view, on an enlarged scale, taken on the line 5—5 of Fig. 4.
Figure 6:
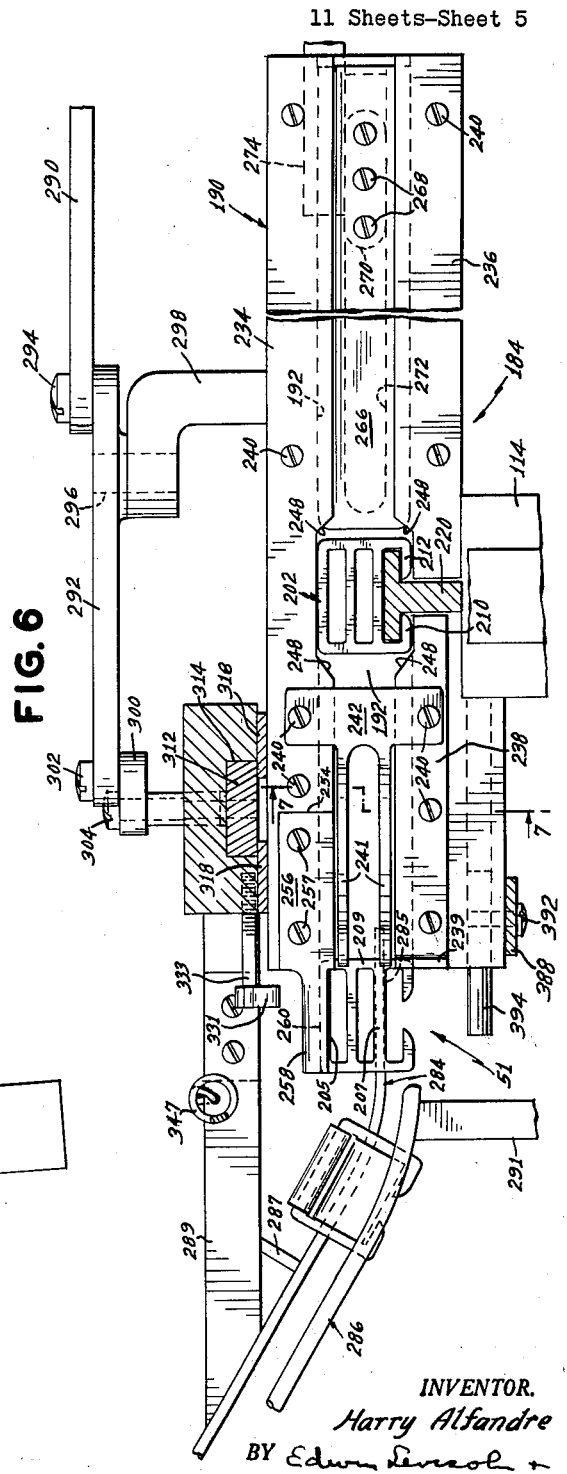
Fig. 6 is a top plan view, partially in section, taken in the direction of the arrow 6 in Fig. 5.

As best shown in Fig. 5, the slide 266 is thinner than the buckles 202. With the slide in the retracted position thereof, as illustrated in said figure, the lowermost buckle of the stack on the buckle mount 220, is clear of the mount 220 and is disposed in the slideway 192 of the guide member 190, forwardly of the slide 266. When the slide is moved forwardly, to the illustrated broken line position thereof, it engages the lowermost buckle of the buckle stack on the device 220. It will be noted that the T-bar device 220, at the bottom thereof, is disposed upwardly of the slideway 192 so that the bottom buckle in the stack, which is disposed in the slideway, clears the T-bar 220, the buckle immediately thereabove being engaged on the T-bar. Consequently, the forward movement of the slide member 266 is effective to move the bottom buckle of the stack to the buckle threading station 51, as illustrated in Fig. 6. When the slide has returned to its retracted position, as in Fig. 5, where it clears the buckle stack, the next buckle is free to move off the T-bar 220 into the slideway 192.

It will be noted that each buckle is securely releasably retained in position at the buckle threading station. More specifically, the outer rib 205 of the buckle is secured within the groove 260 in the projection 258 of the guide member 256, and the buckle rib 207 is disposed on the horizontal portion 285 of the guide rod 284. In addition, the projecting spring fingers 241—241 of the leaf spring 242 overlie the buckle rib 209 so that the buckle is firmly yet releasably retained in position at the threading station. It will also be apparent that, as each buckle is advanced from the buckle supply to the threading station, it dislodges the buckle in position at the threading station, and the dislodged buckle moves out of the threading station down along and between the discharge guide rods 284—286 to a suitable collection bin or receptacle.

Figure 19:
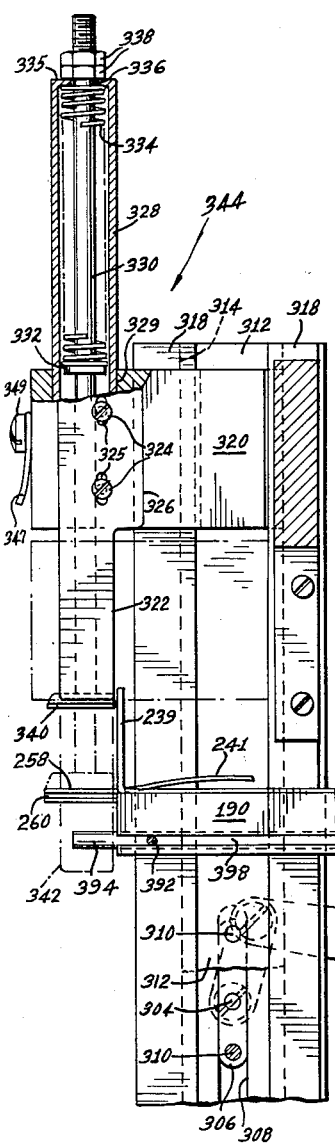
Fig. 19 is a fragmentary view, in elevation, partially in section and on an enlarged scale, taken on the line 19—19 of Fig. 1.

A grooved or internal cam 288 controls the start of the threading operation. Said cam is secured to the previously mentioned shaft 44, as at 281, for effecting the horizontal reciprocation of a link 290, one end of which is secured to a bell crank lever 292, as at 294 (Fig. 23). The bell crank lever is pivoted, as at 296, on an arm 298 carried by the previously mentioned bracket 186. One end of a link 300 is pivoted, as at 302, to the other end of the bell crank lever 292, and the other end of the link is pivoted, as at 304, to a cross head 306 (Fig. 19) which is mounted for vertical reciprocation in a slot 308 defined within a vertical bracket member 316 carried by the base 222. The cross head 306 is connected, as by the pin 310, to a slide 312 (Fig. 6) which is mounted for vertical reciprocation in a recess or slideway 314 provided in the bracket 316. A pair of plates 318—318 are suitably secured to the bracket 316 so as to overlie the groove 314 defined therein. Therefore, it will be apparent that the cam 288 is operative through the described linkage to effect the vertical reciprocation of the slide 312.

The slide 312 mounts a head piece 320 which carries a first threader 322. More specifically, the depending threader 322 is adjustably secured within a groove 326 defined in the header 320 by means of the bolts 324—324 which project through elongated slots 325 defined in the threader 322. A tubular member 328 is force fit into an aperture 329 defined in the support header 320. A rod 330 is mounted for relative movement within the tubular member 328 and is provided with a collar 332 on which is seated one end of the spring 334 through which the rod extends. The other end of the spring abuts the closed top 335 of the tubular member 338, said top being provided with an aperture 336 through which the rod 330 extends. The nuts 338 are threaded on the rod 330, externally of the tubular member 328, for adjusting the tensioning of the spring 334. The rod extends below the head 320, outwardly of the bottom of the tubular member 328 and is provided at the lower end thereof with a presser foot or clamp 340. At the side thereof opposite the side at which the first threader 322 is mounted, the head 320 also mounts a leaf spring deflector 342, as best shown in Fig. 1, so as to depend downwardly therefrom. The foregoing mechanism will hereinafter be referred to as the first threader mechanism 344, and it will be readily apparent from the foregoing that the cam 288 through the described linkage is operable to effect the vertical reciprocation of said threader mechanism 344.

Figure 20:
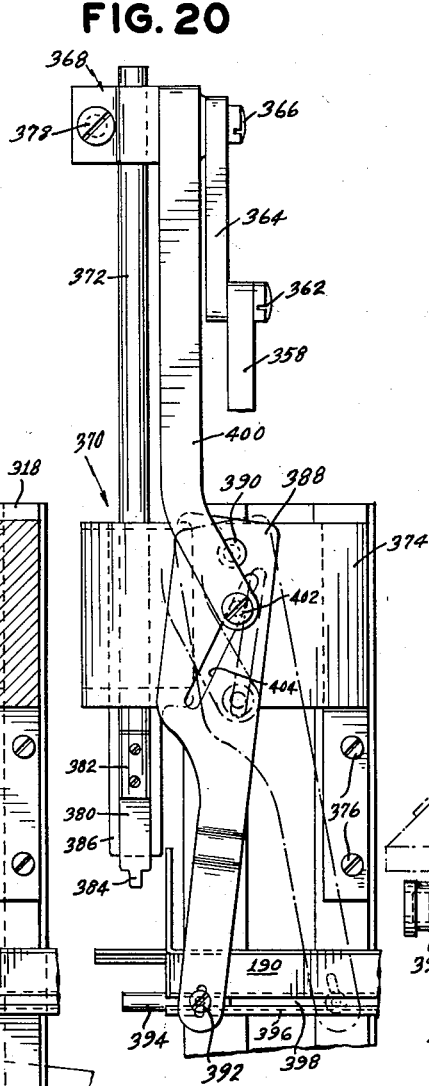
Fig. 20 is a fragmentary view, in elevation and on an enlarged scale, taken on the line 20—20 of Fig. 1.

A grooved or internal cam 346 is mounted on the previously mentioned main drive shaft 34 for operating a third threader mechanism 370. Said cam drives a link follower 348 which is pivotally secured, as by the bolt 350, to a crank arm 352 mounted as at 354 on a shaft 356 (Fig. 2) which is journalled in the previously mentioned bracket 36. The shaft 356 also mounts a crank arm 358 which is secured thereto as at 360. Said crank arm 358 is pivotally connected, as at 362, to a link 364 which in turn is pivotally connected, as at 366, to a clamping member 368 (Fig. 20). The described linkage, operated through the cam 346, is effective to operate the third threader mechanism 370. As here shown, said threader mechanism comprises the vertically disposed rod 372 which is mounted for reciprocation in a bracket member 374 carried by the previously mentioned bracket 316, as at 376. At its upper end, the rod 372 is clamped in the clamping member 368, as by the bolt 378. The third threader 380 is inserted into the lower end of a rod 372, being secured therein as by the securing elements 382. The threader 380 is provided with a free end portion 384 of reduced width. The bracket 374 also mounts a depending leaf spring 386, the free end of which is bent toward the first threader member 322, to engage and guide the latter as hereinafter described in detail.

Figure 21:
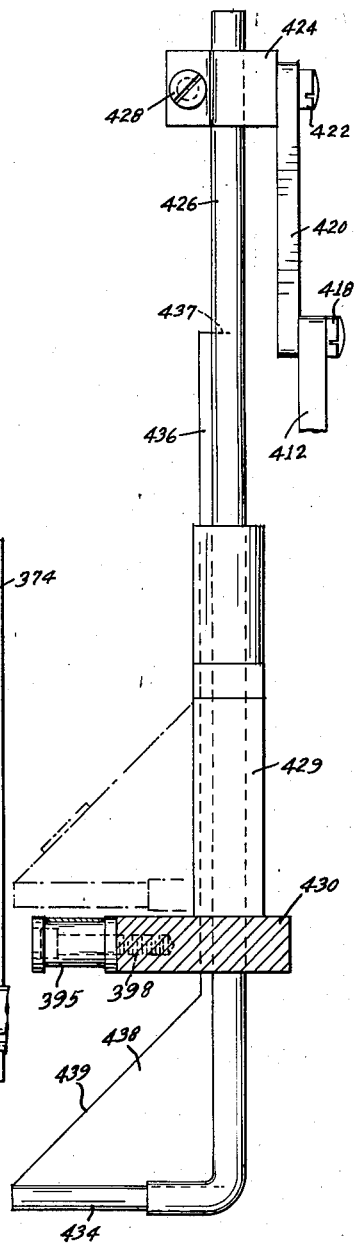
Fig. 21 is a fragmentary view, in elevation, partially in section and on an enlarged scale, taken on the line 21—21 of Fig. 1.

The bracket arm 374 also mounts a lever 388 which is pivoted thereto, as at 390. As best shown in Fig. 1, the lever 390 is bent outwardly and flanks the forward end of the previously mentioned buckle slideway or guide 190. More specifically, at the bottom thereof, the lever 388 is pivotally connected, as at 392, to a horizontally mounted tape guide member 394, which is slidably movable in a slideway 396 defined in the guide member 190, said slideway having the elongated opening 398 therein through which the pivot member 392 extends to engage the guide member 394. An elongated link 400 is rigidly secured at the upper end thereof to the previously mentioned clamp 368, and at its lower end mounts a pin 402 which projects into an angularly directed slot 404 defined in the lever 388. From the foregoing, it will be apparent that the cam 346, operating through the described linkage, is effective to vertically reciprocate the third threader assembly 370 and is also effective to cause the horizontal reciprocation of the guide member 394 into and out of the guideway 396. An additional grooved or internal cam 406 is mounted on the main drive shaft 34 and drives a follower link 408 which is provided with a pin 410 which is secured to a plate 409 mounted in a recess 411 defined in a crank arm 412 (Fig. 1). The crank arm is secured, as at 414, to a shaft 416 which is journalled in the previously mentioned bracket 36. At its free end, the crank arm 412 is pivotally connected, as at 418, to one end of a link 420 (Fig. 21). The other end of the link is pivotally connected, as at 422, to a clamping member 424 in which there is clamped a vertically disposed rod 426 as by the bolt 428. The rod is mounted for vertical reciprocation in a bearing 429 provided on a bracket 430 which is secured, as at 432, to the previously mentioned bracket 114. At the bottom thereof, the rod 426 is bent up, as best illustrated in Fig. 21, and mounts a tubular member 434. A flat plate member 436 is set into a groove 437 defined in the rod 426 and projects outwardly therefrom. The member 436 is provided at the bottom thereof with the laterally extending angular portion 438, having the oblique edge 439 and which is secured to the tubular element 434, it being noted that the member 436 is free to move within a longitudinal cutout 441 provided in the bearing 429. The function of the rod 426 and the parts 434 and 436 carried thereby will hereinafter be described in detail. It will be noted that the tubular member 434 is disposed in a vertical plane which extends across the path of movement of the tape T from the feed device 112, and that the cam 406, through the described linkage, is operable to reciprocate the member 434 vertically across said path of movement of the tape.

Referring now to Figs. 4 and 22–29, three cams 440, 444 and 448 are mounted side-by-side on the shaft 44, and said cams drive the followers 442, 446 and 450, respectively. Follower 442 is pivotally connected, as by the pivot pin 452, to a crank arm 454, which is secured, as by the pin 456, to a shaft 458. Said shaft is journalled in bearings 459, 460 and 462 mounted on the base plate 22, as by the bolts 466. The bearing 462 also journals a second shaft 464. A crank arm 468 is secured, as by a pin 472, to the shaft 458. Said latter crank arm interconnects the shaft 458 and the second threader assembly 470.

Figure 29:
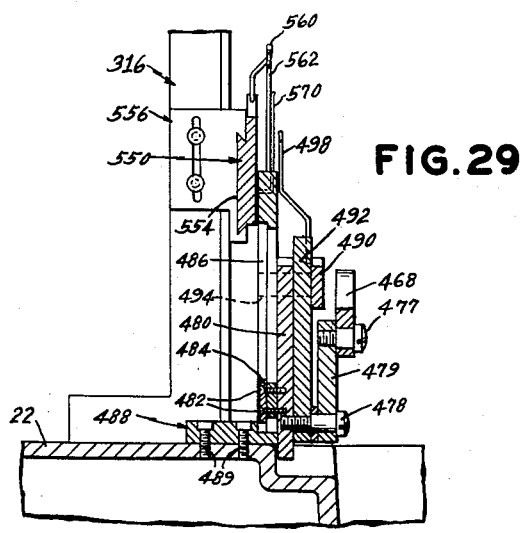
Fig. 29 is a fragmentary sectional view taken on the line 29—29 of Fig. 23.

Provision is made for a bracket guide member 488 which is secured to the base support 22, as at 489—489. The bracket is provided with an elongated slot 486 in which there rides the cross head or slide 484. The slide is secured, as by the elements 482—482 to a member 480 which is in sliding abutment with the bracket member 488, as best shown in Fig. 29. The previously mentioned crank arm 468 is pivotally connected, as by the pivot 477 to one end of a link 479, the other end of which is connected by the pivot 478 to the member 480. A second threader plate 492, which is free to pivot on the pivot member 478, is interposed between the member 480 and the link 479. A strap 490 secured across projections 491—491 provided on the member 480 overlies the plate 492 and prevents the upper portion thereof from moving away from the member 480. The threader plate 492 is provided with a cam slot 496. A pin 494, which is carried by the bracket 488, extends into said cam slot, which is shaped as best illustrated in Figs. 24–27. The threader plate 492 is provided at the upper end thereof, with the projecting second threader 498. The second threader 498 is disposed for operation from the underside of the buckle to be threaded, so as to operate between the first threader 322 and the third threader 380, both of which operate from the upper side of the buckle, said threader 498 being disposed for operation through the intermediate buckle eyelet 206, as hereinafter described in detail. From the foregoing, it will be understood that the cam 440 is operable through the described linkage to operate the second threader 498 to and from the positions thereof illustrated in Figs. 24 and 26.

The previously mentioned cam 444 operates its follower 446 which is pivotally connected, as by the pivot pin 500 to a crank arm 502. Said crank arm is secured by pin 504 to a sleeve 506 about the previously mentioned shaft 458. The sleeve also mounts a crank arm 508 which is secured thereto as by a pin 510. The arm 508 extends downwardly from the shaft 458 and is provided with a pin 512 which extends into a slot 520 provided in a link 524. The previously mentioned shaft 464 also mounts a crank arm 514 which is secured thereto as by the pin 516. The crank arm 514 also depends from its shaft 464 and mounts a pin 518 which extends into a slot 522 provided in the link 524. The link 524 is disposed on the base support 22 and is provided with a lateral extension 526 which extends into a slideway 528 (Fig. 3) defined in the previously mentioned bracket 186. From the foregoing it will be apparent that the cam 444 operating through the described linkage will be effective to slide the link 524 along the base support 22 into and out of slideway 528.

The previously mentioned follower 450 operated by the cam 448 is pivotally connected, as at 530, to a crank arm 532 which is secured, as at 534, to a sleeve 536 about the sleeve 506. A crank arm 538 is also secured, as at 540, to the sleeve 536. Said crank arm 538 mounts a pin 542 which extends into a slot 544 defined in a T-shaped link 546. The link 546 is pivoted, as at 548, to a slide member 550 which is slidably mounted in a groove 554 defined in a guide member 556 which is secured as at 558 to the previously mentioned bracket 316. From the foregoing, it will be apparent that cam 448, through the described linkage, will be effective to reciprocate the slide member 550 into and out of the guide member 556.

A pointed spreader 560 movable in a recess 561 in guide member 190 is secured to the top of the slide member 550, being bent laterally thereof at the free end thereof so as to be disposed in a vertical plane which passes through the eyelet 204 of the buckle mounted in the threading station, as hereinafter described in detail. The upper edge 552 of the slide member 550 defines a cutting edge which cooperates with a cutting member 562 pivoted, as at 568, on the slide 550 so as to define a scissors or pair of shears therewith. More specifically, it will be noted that the depending leg 564 of the shear member 562 is provided with a pin 566 which extends into a rectangular slot 572 defined in the previously mentioned slide link 524. A leaf spring 570 carried by the slide member 550 biases the cutter 562 against the cutting edge 552. From the foregoing, it will be apparent that the movement of the slide member 550 from the position thereof illustrated in Fig. 24 to the position illustrated in Fig. 25 will be effective to move the cutting element 562, as well as the spreader or pilot 560, to the projected position thereof illustrated in Fig. 25, and also to move the pin 566 of the shear member 562 along the slot 572 to engage the left edge thereof, viewing said figures. The subsequent movement of the slide link 524, by crank 508, from the position thereof illustrated in Fig. 25 to the position thereof illustrated in Fig. 26 will be effective to pivot the shearing member 562, as illustrated, to provide a shearing action between the shearing member 562 and the cooperating shearing edge 552 for a purpose hereinafter described in detail.

As previously indicated the cam 444 operating through the crank arm 502 operates the crank arm 508 which in turn causes the horizontal reciprocation of the link member 524. This causes the similar movement of the pin 518, engaged by said link, to rock the crank arm 514, whereby to rock the shaft 464. The shaft 464 mounts a crank arm 574 (Fig. 22) which is secured thereto as at 576. Said crank 574 is pivotally connected, as at 578, to one end of a link 580, the other end of which is pivotally connected, as at 582, to a cutter 584 (Fig. 3). Said cutter is pivoted, as at 586, to a support member 588, which is secured to the previously described bracket members 114 and 430, as by the securing elements 592. A cutting edge 590 is defined by one edge of the support member 588 and a leaf spring 594, which is secured to the bracket member 118, is mounted to urge the cutter 584 against the cooperating cutting edge 590. In this connection, it will be noted that the cutting member 584 extends above the path of travel of the tape from the feed device 112, in the inoperative position of the cutting member, as shown in Fig. 3. From the foregoing, it will be apparent that cam 444 will be effective to operate the cutter element 584 through the crank arms 574 and 514, the link 524 and the crank arms 508.

The cutting member 584 and the shear blade 562 are each preferably made of steel. In order to provide a self sharpening action for each thereof, an insert 600, formed of a suitable abrasive, is provided on the slide 550 for the shear 562 and a similar abrasive insert 602 (Fig. 22) is provided for the knife 584. The shear blade and the knife are each biased against the associated insert, by a spring, as previously described, so that the grinding action of the shear blade and the knife against its associated abrasive insert keeps sharpening each of these cutting elements during the operation of the apparatus.

In view of the foregoing, it will be apparent that cam 50 is effective to operate the tape pulling mechanism 55 for withdrawing the tape from the feed device 112, that crank arm 278 is effective for transferring the buckles individually from the buckle stack to the threading station, that cam 288 is effective to operate the first threading mechanism 344, cam 440 operating the second threading mechanism 470, cam 346 operating the third threading mechanism 370, cam 406 operating the tape withdrawing part 434, cam 444 operating both the shear blade 562 and the cutter 584, and cam 448 operating slide 550 which advances said shear blade and the pilot 560.

In operating the apparatus 10 of the present invention to thread the tape through the buckles so as to provide the finished assemblies illustrated in Fig. 31, a supply of buckles is first transferred from the buckle magazine 196 onto the T-bar 220, as previously described. With the buckle ejector blade 266 in its retracted position, as illustrated in Fig. 5, it will be apparent that the lowermost buckle, in the stack on the T-bar, will move off the T-bar directly into the slideway 192, immediately in front of and in registry with the blade. The tape T is disposed within a suitable bin or receptacle (not illustrated) and the leading end of the tape is then inserted into the tape feed device 112, being threaded through the cooperating members 126 and 136, as illustrated in Fig. 11, and advanced to the position illustrated in Fig. 10, so as to project beyond the lower pivoted finger 136. The switch 23 is then turned to complete the circuit for operating the motor 12. Crank 278, on shaft 44, will operate to advance the ejector blade 266 from the full line position thereof, shown in Fig. 5, to the broken line position thereof, to advance the lowermost buckle from the buckle stack to the threading station 51. At this position, the rib 205 of the buckle is supported in the extension 258 of the guide member 256, the rib 207 of the buckle is supported on the uppermost and horizontal portion 285 of the guide rod 284, and the fingers of the spring 242 overlie and engage the buckle rib 209. In this connection it will be noted that the rib 209 is still within the slideway 192 so that the buckle is supported, at its under surface, at three sides thereof. Simultaneously, with the movement of the blade 266 to position a buckle at the threading station, the cam 50 is operable to advance the jaw members 68 and 76, of the tape pulling mechanism 55, as illustrated in Fig. 10. The open jaw members 68 and 76 begin to move forward and when the rear end 87 of the lower jaw member 76 clears the roller 104, the spring 86 is effective to close the jaw members, the spring 70 biasing the upper jaw member against the roller 92. At this point the first threader mechanism 344 is in its retracted position, so that first threader 322 and the presser foot 340 thereof are clear of the path of movement of the jaw member. Further, it will be noted from Fig. 10 that the jaw members being closed and biased upwardly against the roller 92, the lower jaw member 76 clears the projecting part 258 of the side member 256 and the closed jaws move over the buckle positioned at the threading station.

It will be noted from Fig. 1 that provision is made for a bell crank lever 109 which is pivoted, as at 110, to a bracket 111 provided on the base member 22. The bell crank lever mounts a roller 107, at one end thereof, as by the pin 108, and the other end thereof is engaged by one end of a tension spring 113 which is tied at its other end to the bracket 111. Said spring biases the lever 109 into engagement with a detent 115 on the bracket 111 so as to dispose roller 107 in the path of movement of the lowered rear end 87 of the jaw member 76 but clear of the raised front end thereof. Consequently, when the forward end of the lower jaw member has passed over and beyond the buckle in position at the threading station, the rear end 87 thereof engages the roller 107 for opening the jaws, as illustrated in the full line position of said lever in Fig. 10. The open jaws advance into the forked ends provided on the floating members 126 and 136 of the tape feed device 112 so that the leading end of the tape is disposed between the open jaw members. In this connection, it will be noted that the spring biased pin 164 disposes said members at an angle to position the free end of the tape at a similar angle for insertion between the open jaw members, as illustrated in broken line in Fig. 10. The cutouts provided in said members 126 and 136 permit for the jaw members to move sufficiently therein so that the rear end 87 of the lower jaw member disengages or clears the roller 107 after the open jaw members are disposed about the free end of the tapes. As soon as the lower jaw member 87 has cleared the roller 107, the spring 86 pivots the lower jaw member into engagement with the upper jaw member to close said jaw members upon the tape.

The closed jaw members now begin to retract under the control of the cam 50, it being noted that the lowered end 87 of the lower jaw member now engages the roller 107 and effects the pivotal movement of the bell crank lever 109 toward the broken line position thereof illustrated in Fig. 10, permitting the jaw member 76 to ride over said roller without effecting the opening of the jaws, it being apparent that when the jaw member has disengaged the roller 107, the bell crank lever is returned to its full line position by the spring 113. During said withdrawal of the tape from the feed device 112 thereof over the buckle at the threading station, the spring biased pin 164 and the leaf spring 154 are effective to maintain a desired tension on the withdrawn tape.

The first threader mechanism 344 now begins to move down and the presser foot 340 thereof clamps the withdrawn tape, which is positioned above the buckle in the threading station, against the underlying projecting guide portion 258, as illustrated in Fig. 11, the lowered end portion 87 of the lower jaw member 76 engaging the roller 104 very shortly after the presser foot engages the tape, whereby to open said jaw members. It will be noted that the presser foot 340 is provided with a bevel 341 to clear the jaw members so that the presser foot can engage the tape just as the jaw members clear the guide extension 258, whereby to provide for the opening of the jaw members very shortly after the presser foot engages the tape. The previously mentioned upright part 239 at the forward end of the guide plate 238 serves as a guide for the tape during the withdrawal thereof so as to prevent lateral movement of the tape in a direction toward the feed bar 220, as will be apparent from Fig. 6. Provision is also made for a bolt 333 secured in the previously mentioned bracket 316, the bolt being provided with a deflector plate 331 which is curved toward the threading station. The bolt 333 functions to engage the free end of the tape when released by the open jaws, as illustrated in Fig. 11, so as to prevent the tape from becoming entangled with any other part of the mechanism. The function of the deflector plate 335 will presently appear.

The cam 288 continues to effect the lowering of the first threader mechanism 344, and specifically the head 320 thereof, after the presser foot engages the leading end of the tape, as described. In this connection, it will be apparent that the tubular member 328 is free to move downwardly relative to the rod 330 which mounts the presser foot, said movement effecting the compression of the spring 334, which in turn clamps the presser foot 340 in its tape holding disposition. The action of the distant cam 288 in continuing the lowering of the head piece 320, after the presser foot 340 engages the tape, against the force of the compressed spring 334, is assisted by a tension spring 347. One end spring 347 is connected, as at 349, to the head 320, and the other end thereof is connected to the previously mentioned strap 289.

As previously indicated, as the jaw members advance to engage the tape, in the tape dispensing device 112, the third threader 380 moves up out of a path of movement of the jaw members, as illustrated in Fig. 10 and, in addition, the tape guide and retainer member 394 begins to move out of the guide member 190, toward its projected position. By the time that the tape has been withdrawn from the device 112 and the free end thereof secured by the presser foot 340, the tape retainer member 394 is in its fully advanced position, as illustrated in Fig. 11 and the rod 426 provided with tape withdrawal part 434 is moving down to engage the upper surface of the withdrawn tape. After the free end of the tape is secured by the presser foot 340 and released by the jaw members 68 and 76, the tape withdrawal member 434 engages the tape between the tape retainer guide 394 and a tape guide roller 395 which is carried by a pin 397 secured adjacent the forward end of the feed device 112. Tape withdrawal member 434, as it moves downwardly, carries the tape into engagement with the retainer 394 and the guide roller 395, withdrawing the tape through the feed device 112 and moving it downwardly to said retainer and roller, as shown in dotted line in Fig. 11. It will be noted that the tape passes over the roller 395, under the withdrawal bar 434 and over the tape retaining member 394. During said operation of the tape withdrawal member 434, the spring biased pin 164 and the leaf spring 154 keep the tape in tension, the extent of the downward movement of member 434 determining the amount of tape that is withdrawn.

The continued downward movement of the previously mentioned head 320 of the first threader mechanism 344, after the clamping of the tape by the presser foot 340, moves the first threader 322 through the underlying buckle eyelet 204, as best shown in Fig. 12. The spring deflector member 342 moving downwardly with the first threader, moves between the foot 340 and the stop bolt 333, so as to engage and move the free end A of the tape down between the stop and the buckle holding guide projection 258, as shown in Fig. 12. As previously indicated, the stop 333 is provided with a deflecting element 331 which extends toward the buckle holding projection 258 into the path of movement of deflector 342 so that the deflection element 331 is engaged by the spring deflector 342 thus causing the latter to bend or deflect toward the buckle holding part 258, as shown in Fig. 12. Consequently, the free end A of the tape is urged toward said buckle holding part so that it will not interfere with subsequent movement of the tape withdrawal members 68 and 76 as they advance, at the end of the cycle of operation, toward the tape dispenser to begin the next cycle of operation.

The first threader assembly 344 now begins to move towards its retracted position, raising the deflector 342 and the first threader 322 from the tape loop 132 formed by the latter, as illustrated in Fig. 13. It will be noted that this upward movement of threader assembly 344 does not effect the engagement of the presser foot 340 and the tape, at this point in the cycle of operation, the previously mentioned spring 334 remaining under compression in its tubular housing 328, the upward movement of the housing being effective only to decrease the tension of the spring as applied to the presser foot. With the first threader 322 retracted from the loop 132 formed thereby, the pilot 560 enters the loop slightly before the shear blade 562, to spread the loop so as to facilitate the entrance of the shear blade therein, said parts moving from the position thereof illustrated in Fig. 24 to the position thereof illustrated in Fig. 25, and as shown in Fig. 13, under the control of cam 448. Cam 444, operating through the crank arm 508, now operates the link 524 to effect the pivotal movement of the shear blade 562 to the position thereof illustrated in Fig. 26, to sever the loop 132, as shown in Fig. 14. Simultaneously with the operation of the blade 562, the link 524 which effected said operation of the blade, also moves the pin 518, secured to the crank 514, mounted on shaft 464 to rock the latter for operating the crank arm 574 on said shaft. Said crank 574, through the previously described linkage, operates the second cutter member 584 about its pivot 586, from the position thereof shown in full line in Fig. 3 to that shown in broken line therein, so as to cut the tape immediately outwardly of the ends of the floating members 126 and 136 of the tape dispensing device. The cam 448 operates to retract the slide member 550, the pilot 560 and the blade 562 to the position thereof shown in Fig. 27, the cam 444 operating to retract both cutting members to their inoperative position.

As shown in Fig. 14, the cutting action through the loop 132 will cause the severed loop ends B and C to move apart from each other. The cam 440 had previously begun to raise the second threader assembly 470, through the previously described link 468. The second threader 498 moves up toward the buckle to engage the severed tape end C before it can swing all the way back to its original position. It will be noted from Fig. 14 that the tape end C, when severed, swings out across the path of upward movement of the second threader and the latter engages the severed tape on its return swing, in the broken line position of the tape.

The second threader 498 continues to move upwardly, carrying the engaged end C of the tape up through the overlying buckle eyelet 206, as shown in Fig. 15. The tape portion C is carried upward and into abutment with the main tape strip 130 as shown. It will be noted that the previously mentioned stationary spring plate 386 which had served to guide the first threader 322 downwardly for the first threading operation, is effective also to prevent the severed tape strip 130, raised by the second threader 498, from falling to the left, viewing Fig. 15. It will also be noted that after the tape is severed adjacent the tape dispenser 112 by cutter 584, the pressure applied by the tensioned tape in said area has been released, and the floating members 126 and 136 of the feed device 112 are biased upwardly to their normal position by the spring loaded pin 164, as shown in Fig. 14. After the tape is cut at the dispenser 112, the cut end D thereof slips over the guide roller 395 and falls downwardly, as shown in Figs. 14 and 15. During the foregoing, the cam 346 is completing its cycle of operation to move the third threader assembly 370 to its maximum retracted upward position, from the previous cycle of operation, and this upward movement causes the lever 388 to retract the tape retainer 394 into the guide 190, as shown in broken line in Fig. 20. The second threader 498 is now retracted from the position thereof shown in Fig. 15, and withdrawn from the buckle eyelet 206, so that the raised tape strip 130 and its doubled under end C falls down over the underlying ribs 210 and 212 of the buckle at the threading station, to overlie the eyelet 208 therein. It will be understood that the tape retainer 394 begins to retract as the tape begins to fall over the buckle and, by the time that the tape has fallen on the buckle, said retainer has been completely retracted clear of the tape. In Fig. 16, the tape is shown in broken line as it falls down over the buckle. This combined action of the tape falling on the buckle and the retraction of the member 394, as a support for the tape, causes the dangling end D of the tape to swing in a pendulum like motion, first to the left and then to the right, as illustrated in broken line in Fig. 16.

The rod 426 now begins to rise, it being noted that when the tape swings back to the right, viewing Fig. 16, it swings over the cam portion 438 of part 436 carried by the rod, so that the rising rod 426 causes the cam edge 439 to engage under the swinging tape end D, as best illustrated in full line in Fig. 16. This prevents the dangling end D of the tape from becoming entangled with the retracting second threader mechanism. While this is occurring, cam 346 is effective to begin the lowering of the third threader assembly 370, the third threader member 380 engages the underlying double thickness of the tape, as illustrated in Fig. 16, to thread the double tape thickness through the eyelet 208, by forcing the tape into the opening between the tape ribs 210 and 212. This is effected by the reduced end portion 384 of the third threader 380 which is effective first to force the tape through the opening between ribs 210 and 212, as best illustrated in Fig. 18, and then completely through the eyelet 208, as best illustrated in Fig. 17, so as to complete the third threading operation.

The third threader assembly 370 and the tape withdrawal rod 426 now begin to move up to clear the path of movement of the tape withdrawal members 68 and 76 as they advance to withdraw the next length of tape. The end D of the tape slides off the cam edge 439 as the cam 438 moves up beyond its position in Fig. 17, but the second threader has now completely retracted to avoid the possibility of being entangled by the end D. The tape retainer 394 also begins to move to its projected position and, as the jaws advance to grasp the leading end of the tape in the tape dispensing device 112, the threaded buckle at the threading station is ejected therefrom. This is accomplished by the operation of the crank arm 278 which begins to move the buckle ejecting member 266 to its forward position thereof to advance the lowest buckle in the stack to the threading station. The buckle being advanced to the threading station forces the threaded buckle at the station therefrom, out from under the spring member 242 to position the advanced buckle at the station for the threading thereof. The threaded buckle moves down the guideway constituted by the rods 284 and 286, as best shown in Figs. 5 and 6, said rods guiding the threaded buckle as it moves downwardly by gravity therebetween into a discharge bin or the like (not illustrated).

While I have shown and described the preferred embodiments of my invention, it will be understood that various changes may be made in the idea or principles of the invention within the scope of the appended claims.

Having thus described my invention, what I claim and desire to secure by Letters Patent is:

1. In a buckle threading apparatus, a buckle slideway terminating at a threading station to which buckles are advanced along said slideway, means for releasably holding a buckle in position at said station for the threading thereof, and means defining a discharge guideway extending from said station for the delivery of the threaded buckles from said apparatus.

2. In buckle threading apparatus, a buckle slideway terminating at a threading station to which buckles are advanced along said slideway, means for releasably holding a buckle in position at said station for the threading thereof, and means defining a discharge guideway extending from said station for the delivery of the threaded buckles from said apparatus, said buckle holding means including said discharge guideway means.

3. In a buckle threading apparatus, a buckle slideway terminating at a threading station to which buckles are advanced along said slideway, means for releasably holding a buckle in position at said station for the threading thereof, and means defining a discharge guideway extending from said station for the delivery of the threaded buckles from said apparatus, said discharge guideway means comprising a pair of spaced members adapted to engage threaded buckles discharged from said station, and one of said members having a part at said station for supporting the buckles during the threading thereof.

4. In a buckle threading apparatus, means defining a buckle guideway for advancing buckles to a threading station at the end of said guideway means, means for releasably holding the buckles at said station during the threading thereof, and means defining a discharge guideway extending from said station for the delivery of the threaded buckles from said apparatus, said buckle holding means comprising an extension of one side of said buckle guideway having provision to engage a marginal edge of the buckle in position at said station, resilient means extending from said buckle guideway to overlie and engage the upper surface of the buckle in position at said station, and an extension from said discharge guideway means to the other side of said buckle guideway and positioned at the threading station to engage the lower surface of the buckle in position at said station.

5. In a buckle threading apparatus, means defining a horizontal buckle guideway for advancing buckles to a threading station at one end of said guideway means, means for releasably holding the buckles in horizontal disposition at said station during the threading thereof, and means defining a discharge guideway extending downwardly from said station for the delivery of the threaded buckles from said apparatus, said buckle holding means comprising a horizontal extension of one side of said buckle guideway and having provision to engage a marginal edge of the buckle in position at said station, resilient means extending from said buckle guideway to overlie and engage the upper surface of the buckle in position at said station, and said discharge guideway comprising a pair of spaced rods extending downwardly from said station to engage opposite surfaces of the threaded buckle during the discharge thereof, one of said rods having a horizontal portion extending at the threading station to the other side of said buckle guideway to engage the lower surface of the buckle in position at said station.

6. In a buckle threading apparatus, means for releasably holding an apertured buckle in position for the threading thereof, means for advancing a length of tape to a position at one side of said buckle, threader means operable in timed relation with said tape advancing means to thread the tape in the form of a loop through the buckle aperture, a tape cutter insertable in said loop and operable to sever the latter, and pilot means insertable in said loop in advance of said tape cutter to spread said loop for the insertion of said tape cutter therein.

7. In a buckle threading apparatus, means for releasably holding an apertured buckle in position for the threading thereof, means for advancing a length of tape to a position at one side of said buckle, threader means operable in timed relation with said tape advancing means to thread the tape in the form of a loop through the buckle aperture, a tape cutter insertable in said loop and operable to sever the latter, and pilot means insertable in said loop in advance of said tape cutter to spread said loop for the insertion of said tape cutter therein, a member mounted for reciprocation at the other side of the buckle, said pilot means and said cutter being carried by said member for insertion in said loop.

8. In a buckle threading apparatus, means for releasably holding an apertured buckle in position for the threading thereof, means for advancing a length of tape to a position at one side of said buckle, theader means operable in timed relation with said tape advancing means to thread the tape in the form of a loop through the buckle aperture, a tape cutter insertable in said loop and operable to sever the latter, and pilot means insertable in said loop in advance of said tape cutter to spread said loop for the insertion of said tape cutter therein, a member mounted for reciprocation at the other side of the buckle, said pilot means and said cutter being carried by said member for insertion in said loop, said pilot means being a pointed element projecting forwardly of said cutter.

9. In a buckle threading apparatus, means for releasably holding an apertured buckle in position for the threading thereof, means for advancing a length of tape to a position at one side of said buckle, threader means operable in timed relation with said tape advancing means to thread the tape in the form of a loop through the buckle aperture, a tape cutter insertable in said loop and operable to sever the latter, and pilot means insertable in said loop in advance of said tape cutter to spread said loop for the insertion of said tape cutter therein, a member mounted for reciprocation at the other side of the buckle, said pilot means and said cutter being carried by said member for insertion in said loop, said reciprocable member having a shearing edge that cooperates with said cutter to provide a tape shearing operation.

10. In a buckle threading apparatus, means for releasably holding an apertured buckle in position for the threading thereof, means for advancing a length of tape to a position at one side of said buckle, threader means operable in time relation with said tape advancing means to thread the tape in the form of a loop through the buckle aperture, a tape cutter insertable in said loop and operable to sever the latter, and pilot means insertable in said loop in advance of said tape cutter to spread said loop for the insertion of said tape cutter therein, a member mounted for reciprocation at the other side of the buckle, said pilot means and said cutter being carried by said member for insertion in said loop, said reciprocable member having a shearing edge that cooperates with said cutter to provide a tape shearing operation, and said shearing edge being formed of abrasive material whereby to sharpen said cutter.

11. In a buckle threading apparatus, means for withdrawing a predetermined length of tape from a supply thereof for threading through a buckle, and self-sharpening severing means for severing the withdrawn tape.

12. In a buckle threading apparatus, means for withdrawing a predetermined length of tape from a supply thereof, means for threading the tape length through a buckle to form a pair of straps threaded therethrough, and self-sharpening tape-severing means operable in timed relation with said threading means to sever the withdrawn length from the tape supply and to sever said length into two parts to constitute said pair of straps.

13. In a buckle threading apparatus, means for withdrawing a predetermined length of tape from a supply thereof for threading through a buckle, and self-sharpening severing means for severing the withdrawn tape, said self-sharpening severing means comprising movable cutter blade means and cooperating abrasive means provided with a shear edge, and means for biasing the cutter blade means against the abrasive means.

14. In a buckle threading apparatus, a tape feed device comprising a stationary part having first pivotally mounted finger means and second pivotally mounted finger means overlying said first finger means and defining a tape passageway therebetween, means biasing said first finger means upwardly toward said second finger means whereby both said finger means float on said stationary part, resilient means mounted by said second finger means and disposed within said passageway to tension the tape therein, and detent means limiting the upward displacement of said first finger means by said biasing means.

15. In a buckle threading apparatus, a tape feed device comprising a stationary part having first pivotally mounted finger means and second pivotally mounted finger means overlying said first finger means and defining a tape passageway therebetween, means biasing said first finger means upwardly toward said second finger means whereby both said finger means float on said stationary part, resilient means mounted by said second finger means and disposed within said passageway to tension the tape therein, and detent means limiting the upward displacement of said first finger means by said biasing means, and means for variably adjusting the tension of said resilient means on the tape.

16. In a buckle threading apparatus, means for releasably holding a buckle to be threaded at a threading station, means for grasping the leading end of a tape for withdrawing the tape from a supply thereof to a position at one side of the buckle, means operable in timed relation with said tape withdrawing means to releasably clamp the tape inwardly of said leading end thereof in said position thereof, means for effecting the release of the leading end of the tape by said grasping means, and means to restrain the released tape end against entanglement with said apparatus, said restraining means comprising detent means positioned to catch the released tape end and deflector means to move the released end from said detent means to a position at the other side of the buckle.

17. In a buckle threading apparatus, means for releasably holding a buckle to be threaded at a threading station, means for grasping the leading end of a tape for withdrawing the tape from a supply thereof to a position at one side of the buckle, means operable in timed relation with said tape withdrawing means to releasably clamp the tape inwardly of said leading end thereof in said position thereof, means for effecting the release of the leading end of the tape by said grasping means, and means to restrain the released tape end against entanglement with said apparatus, said restraining means comprising detent means positioned to catch the released tape end and deflector means to move the released end from said detent means to a position at the other side of the buckle, said deflector means comprising a member operable with said clamp means.

18. In a buckle threading apparatus for threading tape through a plural eyelet buckle, means for holding a buckle in position to be threaded, means for withdrawing tape from a supply thereof to a position at one side of said buckle, a first threader operable at said buckle side to thread the tape through one of said eyelets, a second threader operable at the other side of the buckle to thread the tape through another of said eyelets, and a member positioned at said one side of the buckle to guide said first threader and to control the movement of the portion of the tape threaded through the buckle by said second threader.

19. In a buckle threading apparatus for threading tape through a plural eyelet buckle, means for holding a buckle in position to be threaded, means for withdrawing tape from a supply thereof to a position at one side of said buckle, a first threader operable at said buckle side to thread the tape through one of said eyelets, a second threader operable at the other side of the buckle to thread the tape through another of said eyelets, and a member positioned at said one side of the buckle to guide said first threader and to control the movement of the portion of the tape threaded through the buckle by said second threader, said member being disposed in a plane parallel to and intermediate the planes in which said threaders are disposed and having a portion extending toward the plane of said first threader for sliding engagement thereby.

20. In a buckle threading apparatus, means for holding a buckle in position to be threaded, means for advancing the leading end of a tape from a supply thereof to one side of said buckle, means to clamp said tape end, means operable in a predetermined direction transversely of the path of movement of the tape to engage the latter and to withdraw a predetermined length thereof from said supply, means to thread said tape length through the buckle, means to sever said tape length from said tape supply, and means to retain the severed end of said tape length from entanglement with said apparatus.

21. In a buckle threading apparatus, means for holding a buckle in position to be threaded, means for advancing the leading end of a tape from a supply thereof to one side of said buckle, means to clamp said tape end, means operable in a predetermined direction transversely of the path of movement of the tape to engage the latter and to withdraw a predetermined length thereof from said supply, means to thread said tape length through the buckle, means to sever said tape length from said tape supply, and means to retain the severed end of said tape length from entanglement with said apparatus, said last mentioned means comprising said withdrawing means which is operable in a direction opposite said predetermined direction to engage said severed end to prevent the dangling thereof.

22. In a buckle threading apparatus, means for holding a buckle in position to be threaded, means for advancing the leading end of a tape from a supply thereof to overlie the buckle, means to clamp said end of the tape, means reciprocably operable from a position above the tape to engage the latter and carry it downwardly for withdrawing a predetermined length thereof, means to thread said tape length through the buckle, means to sever said tape length from the supply thereof, and means to retain the severed end of said tape length from entanglement with said apparatus.

23. In a buckle threading apparatus, means for holding a buckle in position to be threaded, means for advancing the leading end of a tape from a supply thereof to overlie the buckle, means to clamp said end of the tape, means reciprocably operable from a position above the tape to engage the latter and carry it downwardly for withdrawing a predetermined length thereof, means to thread said tape length through the buckle, means to sever said tape length from the supply thereof, and means to retain the severed end of said tape length from entanglement with said apparatus, tape guide-retainer means positioned to engage the tape length between the buckle and said tape withdrawing means, said retainer means being movable in timed relation with the operation of said severing means from a projected tape engaging position thereof to a retracted inoperative position thereof to release the tape whereby to cause a swinging motion of said severed end, and said reciprocable means being operable during the return thereof to its position above the tape to engage under the severed end to retain the latter against said swinging thereof.

24. In a buckle threading apparatus, means for holding a buckle in position to be threaded, means for advancing the leading end of a tape from a supply thereof to overlie the buckle, means to clamp said end of the tape, means reciprocably operable from a position above the tape to engage the latter and carry it downwardly for withdrawing a predetermined length thereof, means to thread said tape length through the buckle, means to sever said tape length from the supply thereof, and means to retain the severed end of said tape length from entanglement with said apparatus, tape guide-retainer means positioned to engage the tape length between the buckle and said tape withdrawing means, said retainer means being movable in timed relation with the operation of said severing means from a projected tape engaging position thereof to a retracted inoperative position thereof to release the tape whereby to cause a swinging motion of said severed end, and said reciprocable means having a cam portion operable during the return thereof to its position above the tape to engage under the severed end to retain the latter against said swinging thereof.

References Cited in the file of this patent

UNITED STATES PATENTS

| | | |
|---|---|---|
| 2,699,275 | Mulligan | Jan. 11, 1955 |
| 2,715,984 | Brownstein | Aug. 23, 1955 |
| 2,728,497 | Alfandre | Dec. 27, 1955 |
| 2,742,205 | Alfandre | Apr. 17, 1956 |